United States Patent
Gunderson et al.

(10) Patent No.: US 7,806,208 B2
(45) Date of Patent: Oct. 5, 2010

(54) STAIR CLIMBING PLATFORM APPARATUS AND METHOD

(75) Inventors: Louise F. Gunderson, Denver, CO (US); Christian Brown, Denver, CO (US); James P. Gunderson, Denver, CO (US)

(73) Assignee: Gamma Two, Inc., Denver, CO (US)

( * ) Notice: Subject to any disclaimer, the term of this patent is extended or adjusted under 35 U.S.C. 154(b) by 285 days.

(21) Appl. No.: 12/130,753

(22) Filed: May 30, 2008

(65) Prior Publication Data

US 2008/0288128 A1 Nov. 20, 2008

Related U.S. Application Data

(62) Division of application No. 11/063,497, filed on Feb. 22, 2005, now Pat. No. 7,380,618.

(51) Int. Cl.
*B62D 57/00* (2006.01)
*B62D 51/06* (2006.01)

(52) U.S. Cl. .................. 180/8.2; 180/7.1; 180/8.1

(58) Field of Classification Search .......... 180/7.1, 180/8.1, 8.2, 8.7
See application file for complete search history.

(56) References Cited

U.S. PATENT DOCUMENTS

| | | | |
|---|---|---|---|
| 210,492 | A | 12/1878 | Broja |
| 255,693 | A | 3/1882 | Tauber |
| 1,551,127 | A | 8/1925 | Whyel |
| 2,786,540 | A | 3/1957 | Sfredda |
| 3,269,478 | A | 8/1966 | Joslyn |
| 3,299,978 | A | 1/1967 | Sponsler |
| 3,522,859 | A | 8/1970 | Thring |
| 3,802,743 | A | 4/1974 | Hermanns |
| 4,411,330 | A | 10/1983 | Blokland |
| 4,547,173 | A | 10/1985 | Jaworski et al. |
| 4,674,757 | A | 6/1987 | Martin |
| 4,913,685 | A | 4/1990 | Lukatsch |
| 4,993,912 | A | 2/1991 | King et al. |
| 5,102,367 | A | 4/1992 | Mullaney et al. |
| 5,127,484 | A | 7/1992 | Bares et al. |
| 5,248,007 | A | 9/1993 | Watkins et al. |

(Continued)

FOREIGN PATENT DOCUMENTS

DE 199 55 199 C1 6/2001

(Continued)

OTHER PUBLICATIONS

European Search Report mailed Mar. 6, 2009.

*Primary Examiner*—Lesley Morris
*Assistant Examiner*—Marc A Scharich
(74) *Attorney, Agent, or Firm*—Merchant & Gould

(57) ABSTRACT

A method for controlling movement of an intelligent wheel over a discontinuity in a travel surface. The intelligent wheel has a rotational hub and support disc portion that carries a series of arcuately spaced extendable, weight bearing radial spoke mechanisms that can be controllably extended and retracted in response to the anticipated terrain surface over which the wheel is to travel. The hub of the intelligent wheel carries a microcontroller for a set of obstacle proximity sensors, force and position sensors and an appropriate electrical power supply for operation of spokes and control components.

19 Claims, 8 Drawing Sheets

U.S. PATENT DOCUMENTS

| | | |
|---|---|---|
| 5,492,390 A | 2/1996 | Kugelmann, Sr. |
| 5,685,383 A | 11/1997 | Ferrante |
| 5,762,153 A | 6/1998 | Zamagni |
| 5,839,795 A | 11/1998 | Matsuda et al. |
| 6,264,283 B1 | 7/2001 | Rehkemper et al. |
| 6,328,120 B1 | 12/2001 | Haussler et al. |
| 6,341,784 B1 | 1/2002 | Carstens |
| 6,402,161 B1 | 6/2002 | Baghdadi |
| 6,695,084 B2 | 2/2004 | Wilk |
| 6,860,346 B2 | 3/2005 | Burt et al. |
| 7,380,618 B2 | 6/2008 | Gunderson et al. |
| 2002/0179342 A1 | 12/2002 | Quinn et al. |
| 2004/0000439 A1 | 1/2004 | Burt et al. |
| 2006/0090938 A1 | 5/2006 | Tanielian |

FOREIGN PATENT DOCUMENTS

| | | |
|---|---|---|
| FR | 1.532.724 | 7/1968 |

STAIR CLIMBING PLATFORM APPARATUS AND METHOD

CROSS-REFERENCE TO RELATED APPLICATIONS

This application claims priority to, and is a divisional application of, U.S. application Ser. No. 11/063,497 filed on Feb. 22, 2005, now U.S. Pat. No. 7,380,618. The above referenced application is herein incorporated by reference in its entirety.

BACKGROUND OF THE INVENTION

1. Field of the Invention

This invention generally relates to vehicles and more particularly to a platform vehicle that can negotiate obstacles such as stairs.

2. Description of Related Art

Today, there are increasingly complex demands for robotic systems outside a modern factory floor. One significant problem, at present, is that wheeled platforms have difficulty navigating over uneven terrain, and traversing obstacles. While significant work has been done on bipedal and multi-legged robots, these systems typically have much higher power requirements than wheeled platforms. Wheeled platforms are, perhaps, the most efficient mechanisms for moving across any surface. Legged platforms require power both to move the platform horizontally across the surface, and require additional power to both support the platform and to lift and move the legs themselves. The wheel provides a passive support to the load, negating the need for the power needed to lift the platform. However, wheels are only efficient if the surface over which they travel is flat and relatively smooth, and wheels fail if there are either vertical obstacles, or significant voids in the surface. Hence, wheels have shown their worth in carefully engineered environments, and have failed in more complex domains.

Such uneven terrain may include vertical discontinuities, steps, and stairs, and situations where those surfaces are potentially covered with a variety of debris. For instance, if a traditional wheel were approaching a curb from the road surface, the curb would present a vertical obstacle, over which the wheel would have to climb. Since the only driving force on the wheel is the forward rotational motion, the geometry of the wheel and the curb has to translate the forward motion into upward motion, and thus raise the center of mass of the wheel. If the radius of the wheel is sufficiently large with respect to the curb, this transfer of energy is relatively smooth and effective. However, as the radius of the wheel approaches the height of the curb, the energy transfer becomes less effective, until the wheel fails to climb obstacles that exceed its radius.

Currently there is no mechanism that provides generally passive support for the platform to which it is attached, provides power for movement over surfaces, and can provide movement across a wide variety of surfaces, including those found in rough terrain, urban environments, indoors, and disrupted and partially engineered settings.

SUMMARY OF THE INVENTION

Against this backdrop embodiments of the present invention have been developed. One embodiment of the present invention is a platform wheeled apparatus that incorporates a unique intelligent wheel configuration for each wheel in which each wheel can dynamically change its radius to negotiate various obstacles. The intelligent wheel has a rotational hub preferably fastened to a support disc that carries a series of extendable, weight bearing spoke mechanisms spaced around the hub that can be controllably extended and retracted radially in response to the anticipated terrain surface over which the wheel is to travel. The hub of the wheeled platform wheel carries a microcontroller, position sensors, preferably a set of obstacle proximity sensors and force sensors, and an appropriate electrical power supply for operation of the spoke mechanisms and control components.

The hub functions as the mounting point for the intelligent wheel and, in one embodiment, a disc fastened to the hub provides structural support for the other components such as each retractable spoke mechanism including a proximity sensor, distance sensor, and force detector for each spoke. The central portion of the hub is preferably mechanically connected to a driven axle to provide rotational driving force for the platform vehicle. In addition to the mechanical coupling, the central portion of the hub may optionally provide an electrical connection from a power source mounted on the vehicle platform to supply electrical power to the hub mounted electrical components. In the intelligent wheel in accordance with an embodiment of the present invention, the spokes are active. These active spokes extend and retract in response to force, distance and position signals from the various sensors associated with each spoke mechanism. These spoke mechanisms are controlled by an automated microprocessor or microcontroller control system that may be mounted on the wheel itself or the vehicle platform. This allows the wheel to adapt to and negotiate over obstacles and voids in the surface over which it is traveling.

These and other features, advantages and objects of the invention will become more apparent from a reading of the following detailed description when taken in conjunction with the accompanying drawings.

DETAILED DESCRIPTION OF THE INVENTION

Figure 1:
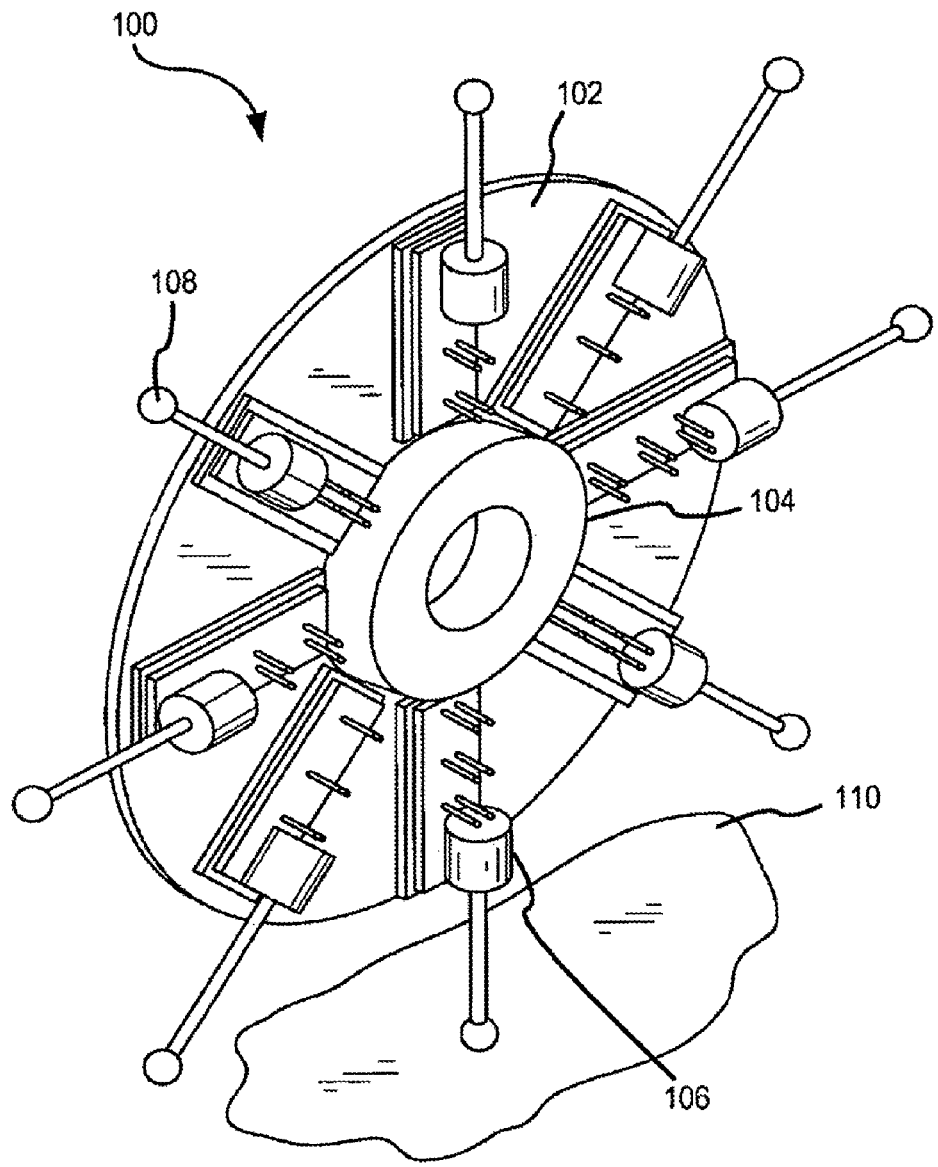
FIG. 1 is a perspective view of one embodiment of a wheel in accordance with the present invention with all spokes extended for illustration purposes.
Figure 5:
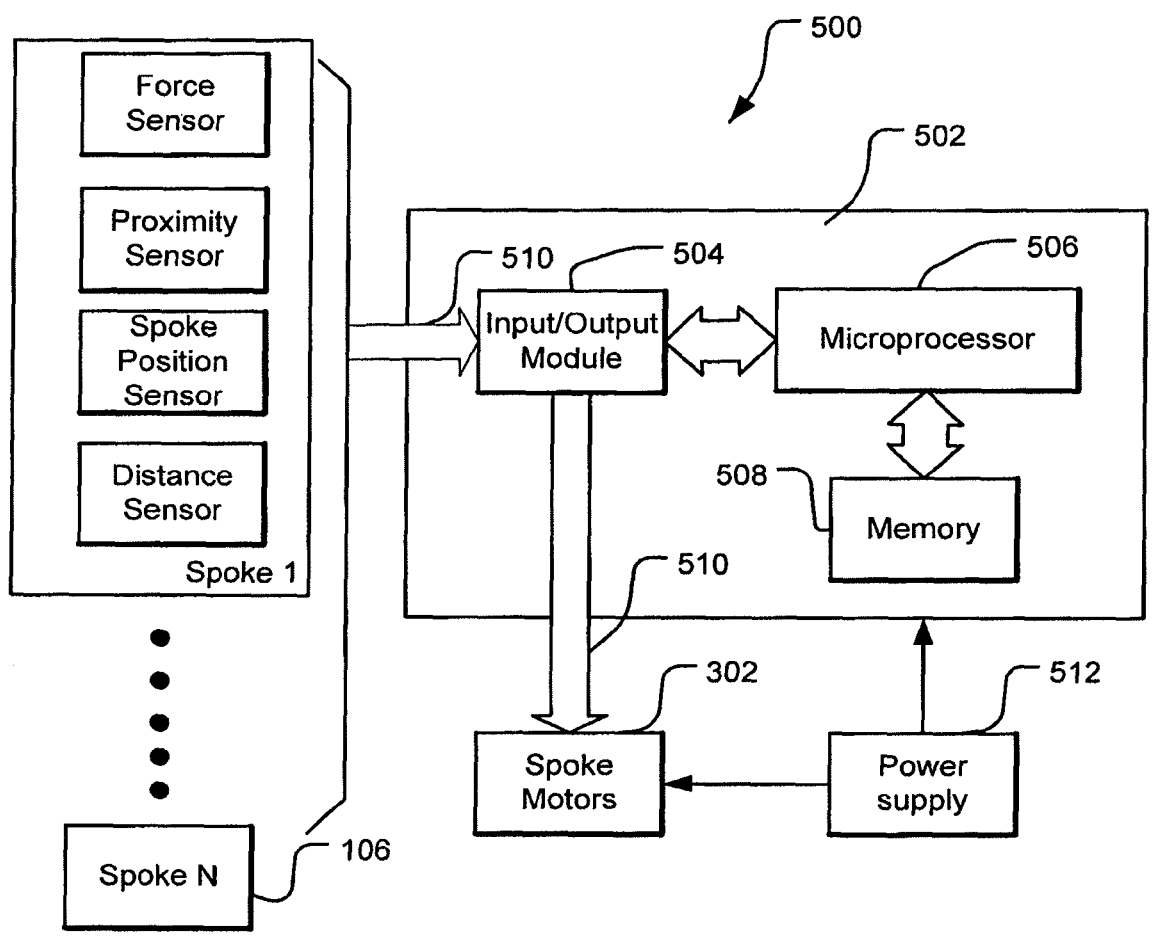
FIG. 5 is a block diagram of the controller for the wheel in accordance with the present invention.
Figure 6:
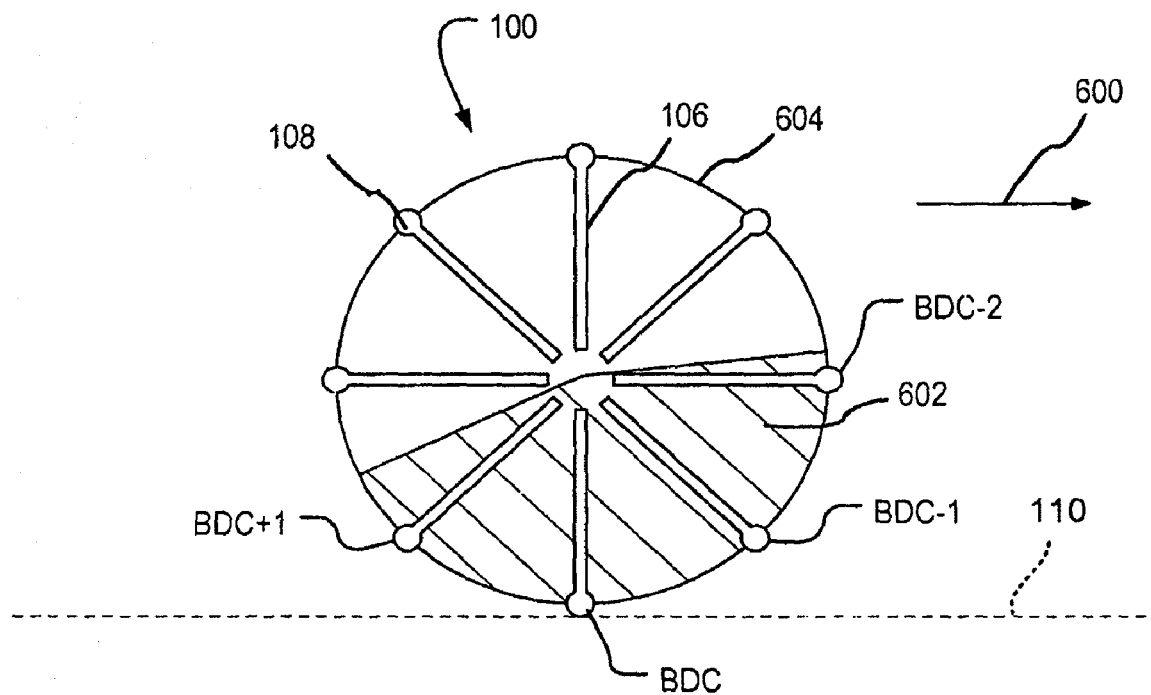
FIG. 6 is a schematic operational representation of a wheel in accordance with an embodiment of the present invention.
Figure 7:
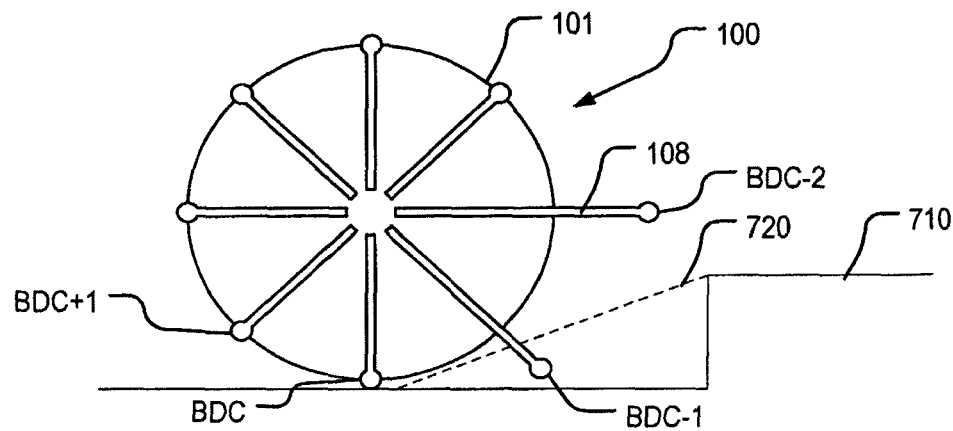
FIG. 7 is a representation of the wheel shown in FIG. 6 as it approaches a step.

An intelligent wheel 100 in accordance with one embodiment of the present invention is shown in FIGS. 1-9. Referring now to FIG. 1, this wheel 100 has a generally disc shaped support portion 102, a central hub 104 about the center of the support portion 102, and a series of radial spoke mechanisms 106 fastened to the support portion 102 and positioned equally spaced around the central hub 104. The spoke mechanisms 106 are dynamically controlled by a controller that controls extension of the spoke or spokes 108 which are supporting the hub 104 at any given time so as to effectively increase or decrease the wheel radius, thus raising or lowering the center of mass of the wheel 100 and its load as it approaches and encounters an obstacle or change in the surface 110 on/over which it is traveling. In addition, the adjacent spoke or spokes 108, which is/are rotating down toward and onto the obstacle, can be extended, such as is shown in FIG. 7, such that they provide a grip point for the wheel 100 on the obstacle, in this case, a step.

In the case of an obstacle on top of the travel surface 110, this combination of movement translates the rotation of the wheel 100 into an upward vertical force that lifts the wheel 100 up onto/over the obstacle. This sequence is reflected in FIGS. 7 and 8, discussed in more detail below. Thus the adjustable spokes 108 act in two distinct ways to enable the wheel to climb vertical obstacles: 1) the weight bearing spoke (s) extend to lift the center of the wheel; and 2) the leading spokes (see leading spokes in FIG. 8) can be extended over the obstacle such that the continued rotation of the wheel 100 will cause the spoke 108 to act as a lever arm and raise the wheel 100. If the obstacle takes the form of a void in the surface (either a hole, or a drop off, e.g., down steps) the spokes 108 work in an analogous way to both support the hub 104, and to lower the wheel 100 onto the new elevation of the travel surface 110. This sequence is reflected in FIG. 9.

There are three classes of sensors positioned either on each of the spoke mechanisms 106 or spaced around the hub 104. One set detects the presence of vertical obstacles and voids, i.e., proximity or distance sensors, and the second senses the orientation of the hub 104, so that the control system can track which spokes are up, and which are down, at bottom dead center (BDC), and track the angle with respect to BDC of each spoke 108. The third class of sensors are force sensors that detect both inline (along the axis of the spokes 108) and lateral (side forces on the spoke tips) forces on the spokes 108. While in many applications it might be possible to use external sensors (sensors mounted on the mobility platform), this would require that either data streams or control streams be transmitted from the platform onto the rotating wheel. To reduce the communications needs, and to reduce the sensor lag, in this embodiment of the present invention, the intelligent wheel 100 has dedicated sensors mounted on the hub 104 to provide real-time input about voids and vertical obstacles which the current spokes 108 may be approaching.

Position Sensors

The position sensors can be either simple obstacle detectors (presence or absence information only), or they can be ranging sensors, which provide distance information. Preferably, these are ranging sensors so that the control system can anticipate the timing of approach of the wheel 100 to the obstacle or discontinuity in travel surface 110 accurately. Finally, any of a number of sensor technologies may be utilized, including active infrared, sonar, laser, and/or capacitance sensors in the spoke tips. As long as the sensors are preferably capable of responding to the presence of a vertical obstacle within a distance of about two radii of the wheel 100, and detect voids directly in front of one or more lowering spokes, i.e., at least the spoke immediately in front of the spoke at BDC, there is anticipated to be enough information for the wheel 100 to react to the changes in terrain.

Angular Orientation Sensors

Orientation sensors give the intelligent wheel control system information about which spokes 108 are pointing down, and which are up. This is needed to reduce excess power consumption caused by unnecessary extension and retraction of the spokes. Only the spokes which are rotating into support positions need to be adjusted to the appropriate extension. This band of positions, about 120 degrees of rotation, as shown in FIG. 6. Those on the remaining portion of the wheel can be left alone, thus reducing power consumption. To do this, the wheel controllers 500 needs to be able to detect the current orientation of the wheel 100, and from that identify the active spokes 108.

Force Sensors

Figure 8:
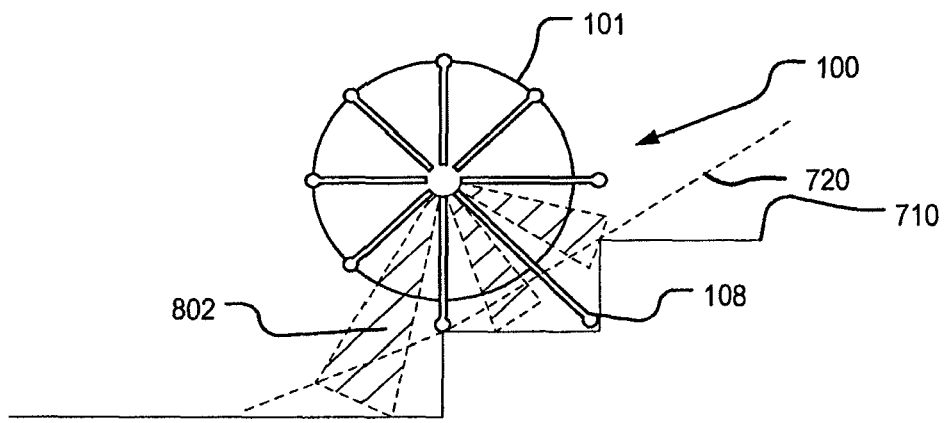
FIG. 8 is a representation of the wheel shown in FIG. 6 after having mounted the step shown in FIG. 7.

The final class of sensors provide feedback on the forces that each spoke is currently experiencing. This information is used by the intelligent wheel controller to assess the correct response needed for the wheel 100 to continue moving. For example, during curb climbing, the lead spoke can be extended over the top of the curb to act as a lever and assist in raising the wheel over the obstacle, as is shown in FIG. 8. This will put lateral forces on the spoke 108, which can be detected and integrated with the lifting forces on the other spokes (e.g. one at BDC) to correctly and smoothly lift the wheel 100 up onto and over the curb or stair tread.

Microcontroller and Software

Given the data from the sensors, and the ability to extend and retract the adaptive spokes 108, a control system is needed to tie everything together. The final component of the intelligent wheel 100 is a microcontroller and its associated software. A block diagram of an exemplary control system 500 is shown in FIG. 5. There are a number of robust microcontrollers which can support both the input data bandwidth from the sensors, and the required control signal data streams to the spokes. The primary function of the microcontroller is to detect upcoming vertical discontinuities, and configure the variable geometry to 'smooth out' the travel.

The controller system 500 is an active sensor/controller system that can adapt the effective shape of the wheel to conform to the terrain that is being traversed in a reactive manner. This system 500 allows the spokes 108 of the intelligent wheel 100 to act as levers and lift the wheel 100 when traversing obstacles and when climbing and descending stairs. It is also designed for efficient traversal of smooth surfaces such as roads, floors and sidewalks, which can be reconfigured to provide high traction traversal of rough terrain and obstacles.

Figure 3:
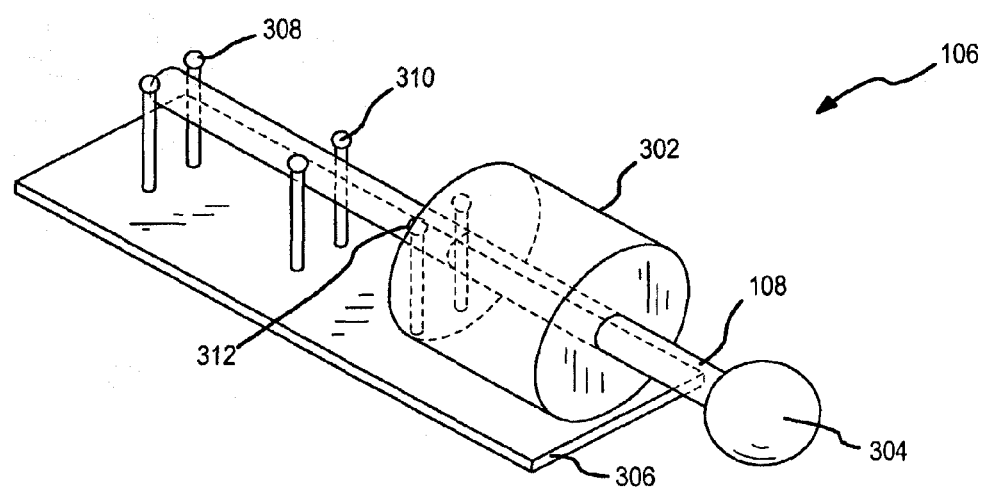
FIG. 3 is a separate perspective view of one exemplary spoke mechanism for the wheel shown in FIG. 1.

One of the spoke mechanisms 106 is separately shown in FIG. 3. The spoke mechanism 106 includes a stepper drive motor 302 that carries a spoke 108 as its lead screw. The spoke 108 has a ball shaped foot 304 made of a high friction material such as a rubber or resilient plastic material. This foot 304 may also incorporate within it a force sensor. The stepper drive motor 302 is fastened to a base plate 306 that is in turn fastened to the support portion 102. The base plate 306 carries three pairs of position sensors 308, 310 and 312. Position sensors 308 sense when the spoke 108 is fully retracted. Position sensors 310 sense when the spoke 108 is at a mid position, and position sensors 312 sense when the spoke 108 is fully extended. Since this embodiment utilizes a stepper motor driven lead screw spoke arrangement, the sensors 308, 310, and 312 may alternatively be eliminated if reliance in the controller is made solely on the stepper motor position. The spoke mechanisms 106 are designed to provide passive physical support of the wheel 100 and the ability to extend and retract to alter the geometry of the wheel 100. The support is preferably passive (e.g., it does not require the expenditure of power to maintain the extension of the spoke) in order to minimize the power consumption. The present shown embodiment 106 utilizes electromechanical lead screws for the extension mechanism. However, these could be replaced with hydraulic actuators, pneumatic actuators, or any scheme that does not require power to hold position.

Figure 4:
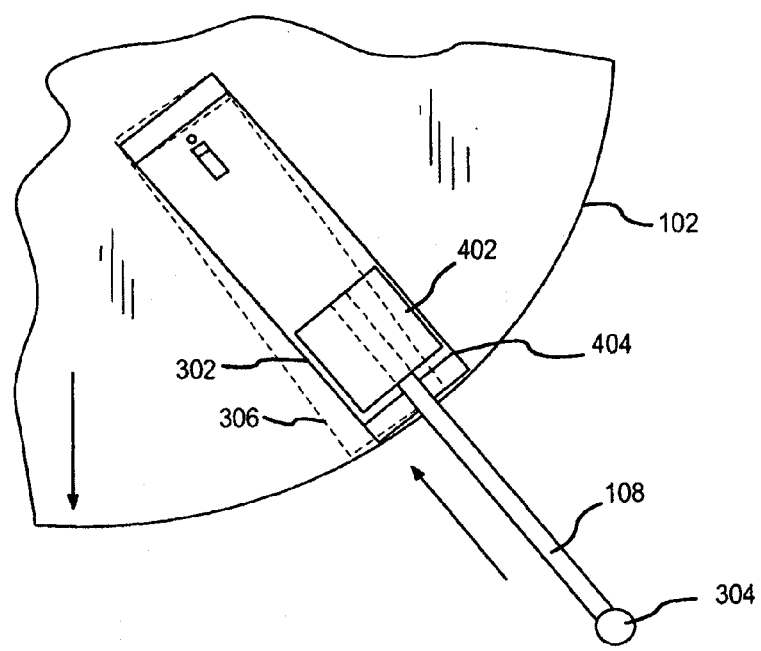
FIG. 4 is an enlarged partial side view of one of the spoke mechanisms mounted on the wheel shown in FIG. 1.

The spoke mechanisms 106, separately schematically shown in FIGS. 3 and 4, are equally spaced and mounted around the circumference of the hub 104, with the axis of each spoke 108 aligned radially to the center of the hub 104. Thus any extension or retraction of the spoke has the effect of altering the radius of the wheel 100. In a preferred implementation the extension of the spoke 108 is achieved by rotating a lead nut with a stepper motor 302, controlled by the microcontroller. The total extension of the spoke can approach the diameter of the hub, giving the ability to change the wheel radius by over 200%. In such a configuration, the opposing spoke mechanisms 106 (on opposite surfaces of the circular wheel 100) would necessarily have to be slightly offset so as not to interfere with each other (occlusion) when both are retracted. This offset can be either offset to either side of the center of the wheel or may be in different parallel planes along the Z axis of the wheel. An advantage of such a configuration is that it would give the wheel 100 a wider contact surface, or footprint, which can aid wheel and vehicle stability.

The spokes 108 and stepper drive motor 302 are mounted to the portion 102 via a pair of intermediate surface plates 402 and 404 shown in FIG. 4. Intermediate surface plate 402 allows a small amount of axial (radial) travel resisted by a spring. This is designed to allow the entire spoke 108 and stepper drive motor 302 to be forced radially inwards in response to an axial load, and return to its normal position when the load is removed.

This intermediate surface plate 402 is in turn mounted to a second intermediate surface plate 404 which allows a slight lateral or tangential motion in response to a tangential force applied to the spoke 108. Again, springs cause a return to the rest position when the tangential force is removed. This final intermediate surface plate 404 completes the mechanical components of the spoke mechanism 106 and the base plate 306 is mounted directly to the support portion 102 of the wheel 100. The forces on these two intermediate plates 402 and 404 are transmitted to the controller for use in dynamically compensating for various motions of the wheel 100. These sensors provide data about the state of the wheel and its sub-components to the microcontroller. A single position sensor can be used to detect the small radial shift caused by radially inward force, and two position sensors can be used to detect the small displacement caused by lateral forces on the spoke 108 (one for clockwise force, one for anti-clockwise). Alternatively, a single resilient baseplate, providing a small amount of displacement in response to applied forces in either radial or lateral directions could be utilized with the same sensors to provide force information to the controller.

Figure 2:
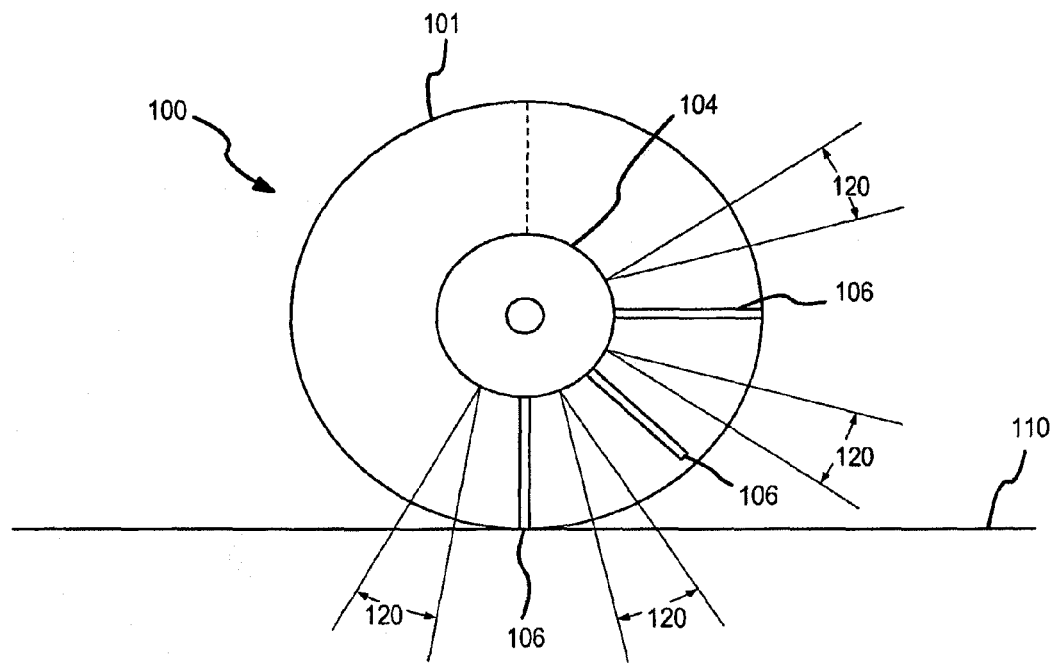
FIG. 2 is a simplified representative side view of the wheel shown in FIG. 1.

There are obstacle sensors associated with each spoke 108. A schematic representation of the sensor positioning is shown in FIG. 2. Each spoke mechanism 106 has associated with it a proximity sensor that senses objects in a directed path 120. These sensors are generally used to detect either positive or negative vertical discontinuities in the region directly in front of the associated spoke 108. This information allows the microcontroller to extend the spoke 108 to either provide support over a void in the surface 110, or to provide lift to climb over a step or curb. Preferably these sensors are active infrared (IR) ranging sensors; however any one of a number of equivalent technologies can be used. An orientation sensor (not illustrated) is used to determine which of the spokes 108 are down and which are up. This information is used to assess which spokes need to extend or retract in order to overcome the current obstacles in the path of the wheel. More preferably, the wheel orientation sensor(s) may be attached directly to the driven axle to provide angular position of the wheel 100 and therefore specific orientation of each spoke 108 to the control system 500.

The control system 500 is shown in block diagram form in FIG. 5. The system 500 includes a controller 502, an input/output module 504, a microprocessor 506, a memory 508, and sufficient Input/Output (I/O) lines 510 to support the various position, orientation, force and directional sensors and the stepper drive motor 302 in the spoke mechanisms 106 spaced around the wheel hub 104. In addition, a necessary power supply 512 may be provided or power could be supplied from the vehicle drive power (not shown). The controller 502 can be either hard-coded, such as a Programmable Logic Controller (PLC), or can be any one of a number of simple programmable controllers.

The wheel 100 in accordance with the illustrated embodiment of the invention is schematically shown in side view on a travel surface 110 in FIG. 6, and moving in a direction indicated by arrow 600. The control system 500 views the sensors and spoke mechanisms 106 that lie in the shaded zone 602 as being active. This active zone typically extends from about horizontal in the direction of travel clockwise through an angle of about 145 to 160 degrees. This angle can be modified to as little as about 45 degrees in some applications. However, to anticipate obstacles like stairs, an active zone angle of at least 90 degrees is believed to be required. The mechanisms 106 in the active zone 602 are continuously providing information to the control system 500. The mechanisms that are in the inactive, or un-shaded zone 604, are retracted and their sensors do not provide data to the control system 500.

Traversing level terrain is the default behavior of the wheel 100. In this condition, all spokes 108 are retracted and the wheel 100 rotates on the surface 110 as a normal wheel. In the simplified view of FIG. 6, eight spoke mechanisms 106 with associated spokes 108 and sensors are shown. The spoke 108 at bottom dead center, i.e. weight bearing, is designated "BDC". The immediately adjacent spoke mechanism in the direction of travel 600 is designated BDC−1, and the spoke mechanism 106 next adjacent is designated BDC−2. As the wheel 100 is rotated, this designation sequence changes to the next set of spoke mechanisms as they come within the active zone 602.

The spokes begin in their 'at rest' retracted position as in FIG. 6. As the wheel rotates, one spoke after another moves into the active zone (those spokes encompassed by approximately 150°) from horizontally in front of the hub, through to about an angle of 60° behind the hub. The leading spoke sensors first attempt to detect either a positive obstacle, or an upward lateral force on the spoke 108. On level terrain, neither of these forces are detected. As the spoke rotates to just before the vertical position BDC, the axial sensor is scanned for the expected inward force. When this is detected, the spoke is left in the retracted state, and no further processing is required. This provides a wheel geometry that is an efficient minimal radius circle, and power is only expended on sensors.

Now consider FIGS. 7 and 8. The behavior associated with uneven terrain climbing is purely reactive. Each wheel 100 attached to the mobility platform (not shown) is responsible for sensing the path in front of it, via the sensors associated with each spoke mechanism 106, and reacting to any sensed obstacles by extending or retracting the appropriate spoke 108. The sensor field of view is represented by the hatched areas 802 shown in FIGS. 8 and 9. The behavior model is similar to that of level terrain, except that when the wheel approaches an obstacle (say a curb that must be climbed), the sensors associated with the spoke 108 entering the active zone 602 detect the obstacle, in this case surface 110 is a set of stair steps 710. Based on the current orientation of the wheel 100 at the time that the obstacle is detected (BDC−2), the control system 500 can estimate the height of the curb, or first step. Using this information, the micro-controller 502 begins extending the series of spokes 108 from the beginning of the active zone 602 through to the current weight bearing spoke 108. This is the spoke 108 at BDC in FIGS. 6 and 7 and 8. Those spokes 108 that are not yet in contact with the surface 710, i.e. BDC−1 and BDC−2, are sequentially extended as shown to take the weight of the wheel 100 at slightly greater and greater radii, in effect building a virtual surface or ramp 720 that the outer circumference 101 of the wheel 100 will effectively follow on as the wheel lifts itself up to the height needed to transition onto the upper surface. The center of the wheel 100 will likewise follow a parallel path to the virtual surface shown. As the spokes rotate out of the active zone 602, they are retracted to their rest position, ready to be extended again as needed.

Figure 9:
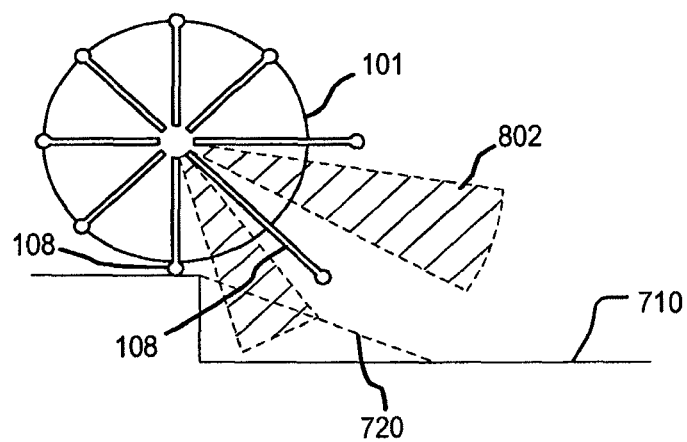
FIG. 9 is a schematic operational representation of a wheel as in FIG. 6 as the wheel approaches a down step.

Descent, shown in FIG. 9, is basically the reverse of a climb. However, the sensors associated with the load bearing spokes control the changes in geometry. As the spoke 108 swings into the support role at BDC, the sensors will detect a void immediately in front of (or beneath) the leading (BDC−1) spoke 108. This condition causes the micro-controller 502 to extend the spoke at BDC−1 until a surface is encountered (using the force sensors). Using this information, and data from the spokes 108 swinging into position, the micro-controller 502 can calculate an effective surface that will lower the wheel 100 smoothly onto the new portion of the travel surface 110. In addition, as a spoke 108 becomes load bearing, the microcontroller can begin the process of retracting the spoke, thus lowering the wheel 100 down onto the anticipated new level.

Figure 10:
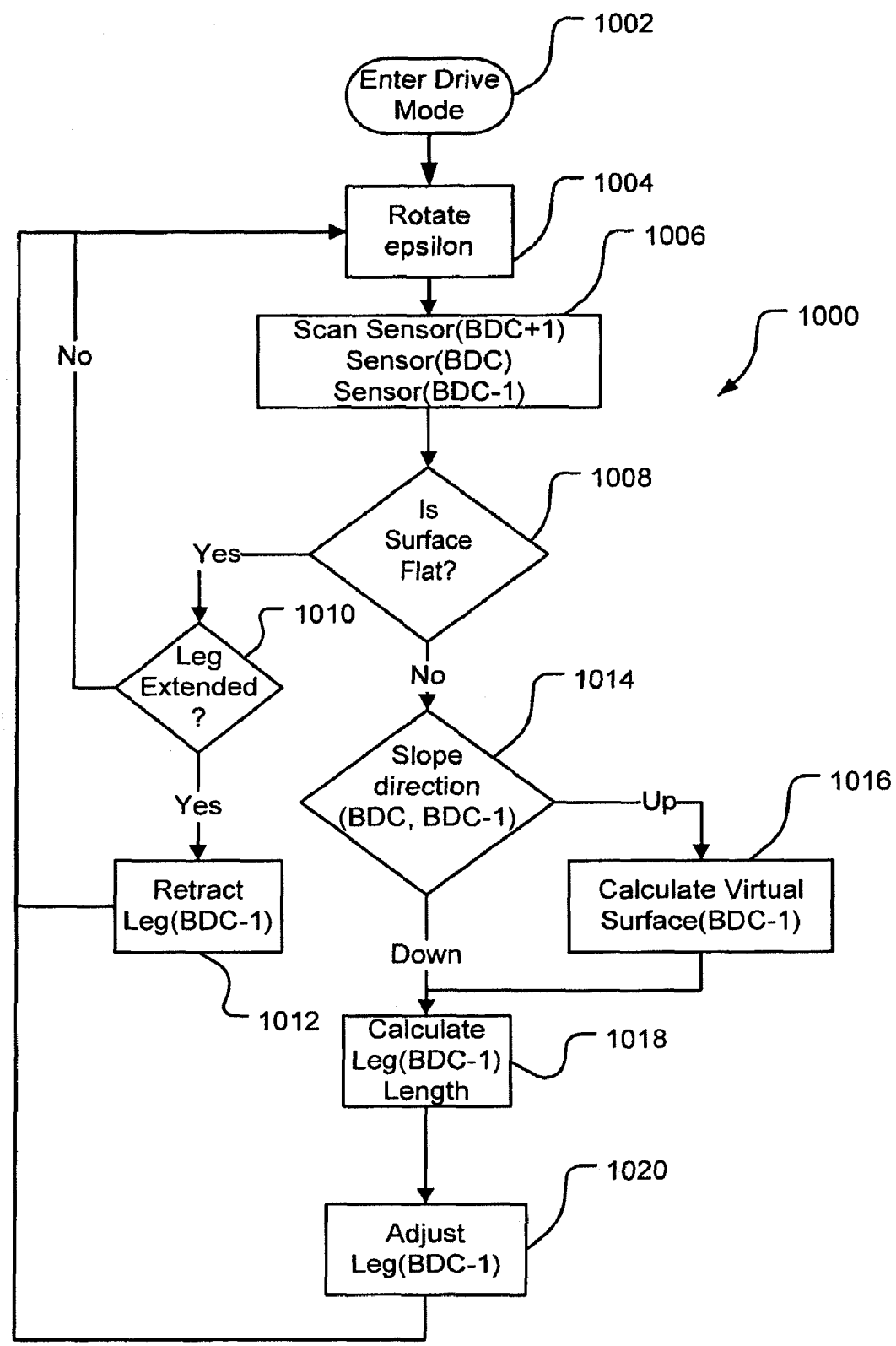
FIG. 10 is an operational flow control diagram for the controller when it is controlling positioning of a weight-bearing spoke at bottom dead center.

A control flow diagram 1000 for the wheel 100 at BDC+1 is shown in FIG. 10. This process is sequentially performed by the control system 500 for each spoke mechanism 106 as each rotates into a position just after it is weight bearing, i.e., a BDC+1 position. It should be understood that the control system 500 is a continuous sense-plan-act reactive system. As such it is continuously monitoring the sensed environment. However, for the purposes of capturing the control flow, an approximate minimum angular displacement "e" (epsilon) is used herein. This epsilon is dependent on the geometry of the wheel 100, and spokes 108, as well as the speed of the computational system in microprocessor controller 502 and the rotational velocity of the platform drive system. These implementation dependent physical quantities will determine the reactivity of the entire system, and this defines the epsilon term. In general, this control loop should be executed no less frequently than 300 times per complete revolution of the wheel 100. Another term that is used is "delta". The delta term is used to reduce the effects of sensor uncertainty and surface variation on the wheel operation. It is dependent on both the types of sensors and the environments into which the wheel 100 is to be deployed. With low noise sensors and clean smooth surfaces, the delta term can be very small. However, as the uncertainty of the sensors increases or as the environment becomes more rugged, the delta term should be made larger to reduce unnecessary changes to the spoke lengths.

Control begins in operation 1002 where the controller 500 enters a drive mode. Control then transfers to operation 1004. In operation 1004 the intelligent wheel 100 drive motor senses axle rotation by a predetermined amount epsilon. When this position change is detected control transfers to scan operation 1006.

In scan operation 1006, the sensors associated with the mechanism 106 at the BDC+1 position, the BDC position, and the position immediately before BDC (BDC−1) are scanned and data provided to the microprocessor 502. Control then transfers to query operation 1008.

In query operation 1008, the distance data for the spoke mechanisms at BDC+1, BDC, and BDC−1 are compared in order to determine whether the sensed surface 110 is flat. The calculations are as follows:

FLAT(S1, S2, S3):=
(abs(S1-S2)<delta)&&
(abs(S2-S3)<delta)&&
(abs(S1-S3)<delta)&&
(abs(2*S2-S1-S3)<delta)

Where S1 is the spoke at BDC+1
S2 is spoke at BDC
S3 is spoke at BDC−1

If the sensed surface is flat, control transfers to query operation 1010. On the other hand, if the sensed surface 110 is not flat, control transfers to query operation 1014.

In query operation 1010, the query is made of the mechanism 106 at BDC−1 whether the spoke 108 is extended. If the spoke is not extended, then this is the correct spoke position for flat terrain, so control passes back to rotate the wheel 100 another epsilon operation 1004. However, if, for some reason, the spoke is extended, then the spoke mechanism at BDC−1 is retracted in operation 1012. Control then passes back to rotate epsilon operation 1004.

If the sensed surface 110 is not flat and control passes from query operation 1008 to query operation 1014, the direction of the slope is determined from a comparison of the BDC and BDC−1 signals. If the slope is positive, or up, control passes to operation 1016. If the slope is negative, or down, control passes to operation 1018. The slope direction calculation in operation 1014 is determined from the following:

Slope (S1, S2):=
(S1-S2)<delta=>Down
(S1-S2)>delta=>UP

Where S1 is the surface (sensor BDC+1)=cos(theta-32)* reading
Where S2 is the surface (sensor BDC)=cos(theta)* reading
Where S3 is the surface (sensor BDC−1)=cos(theta)* reading
and where "reading" is the raw distance from the sensor and "theta" is the angular separation between the axis of the BDC spoke and the point on the surface directly below the center of rotation of the wheel.

In operation 1016, the "up" virtual surface for the upcoming leg (BDC−1) is calculated according to the formula: VirtualSurface(BDC−1)=(Surface(BDC+1)+Surface(BDC))/2. Control then transfers to operation 1018 discussed immediately below.

If the slope is down, a new virtual surface calculation is not needed, but a new leg extension calculation is needed. Control transfers to operation 1018. Here the leg length for the spoke mechanism 106 at BDC−1 is calculated by the formula:

leglength (BDC−1)=VirtualSurface(BDC−1)+Extension(BDC)

Control then transfers to operation 1020. In operation 1020 the spoke mechanism 106 at BDC−1 position is adjusted as appropriate. Control then transfers back again to rotate epsilon operation 1004 and the process repeats.

Figure 11:
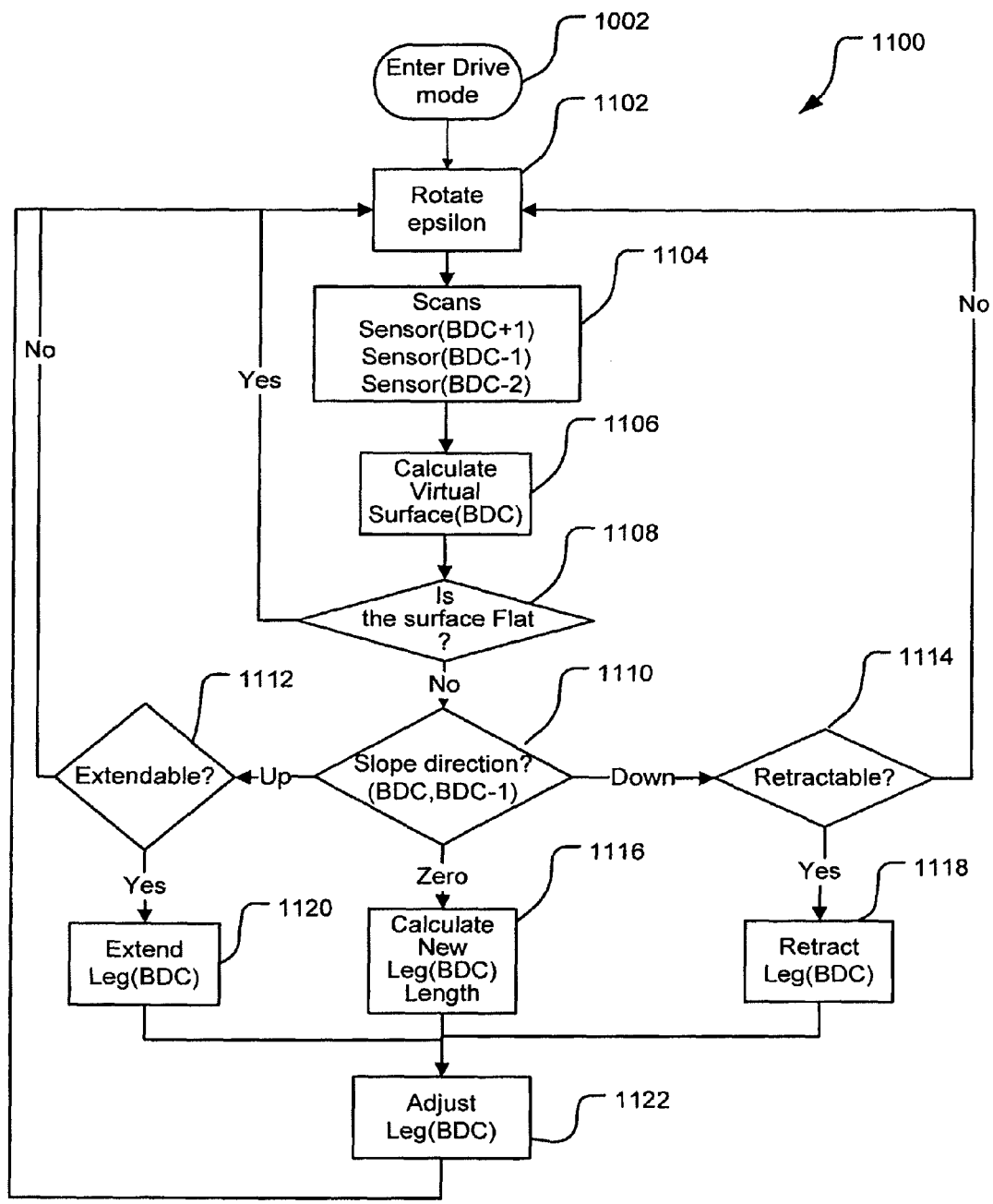
FIG. 11 is an operational flow control diagram for the controller when it is controlling positioning of a spoke that is approaching bottom dead center.

In addition, for the spoke mechanism 106 at BDC position, the control flow is as shown in FIG. 11. Control flow 1100 applies to any spoke mechanism 106 that becomes weight bearing at BDC. Operations again begin in operation 1002 where drive mode is entered. Control then transfers to operation 1102 where the wheel 100 is rotated by epsilon. Control then transfers to scan operation 1104. In scan operation 1104 each of the sensor sets for the spoke mechanisms currently at BDC+1, BDC−1 and BDC−2 are scanned for their output data signals. Control then transfers to operation 1106 where a virtual surface at BDC is calculated. Thus the virtual surface may be viewed as:

VirtualSurface(BDC)=SURFACE(BDC+1)−SURFACE(BDC−1).

Control then transfers to operation 1108 which queries whether the BDC surface is flat. If it is, control transfers back to rotate epsilon operation 1102. If it is not flat, then control transfers to query operation 1110.

In query operation 1110, the determination is made whether the slope is zero, up (positive) or down (negative). In other words, is the discontinuity in travel surface a rise or fall. If the slope is up, control transfers to query operation 1112. If the slope is zero, i.e. the surface is flat, control transfers to operation 1116. If the slope is down, control transfers to query operation 1114.

In query operation 1112, the query is made whether the spoke mechanism 106 at BDC is extendable, i.e., whether it can be extended further. If so, control transfers to operation 1120 where the leg is extended by about half the distance from the surface to the current tip position. Control then passes to operation 1122.

In query operation 1114, if the slope is down the query is made whether the spoke mechanism at BDC is retractable, i.e. whether there is room for further retraction of the spoke 108. If so, control passes to operation 1118 where the leg is retracted again by about half the distance from the travel surface to the current spoke tip position. Control then passes to operation 1122.

In query operation 1110, if the slope is zero, then control passes to operation 1116 where a now leg length at BDC is calculated. Control then passes to operation 1122.

In operation 1122 the BDC leg is adjusted. This calculation is exemplified by CALCULATELEG( )in which the New Length=VirtualSurface(BDC)+(CurrentExtension(BDC)*γ) where γ is a function of the rotational velocity of the wheel 100 and the extension velocity of the spoke 108. The effect is that the BDC length extension will reduce the difference between the current extension and the actual surface in each iteration by about ½ since there are about 300 iterations per revolution of the wheel and a much smaller number of spokes, the actual value depends on the total travel of the spoke, the maximum velocity of the spoke extension/retraction, the radius of the wheel, and the rotational velocity and direction of rotation of the wheel 100.

The value is relatively insensitive to small errors, since the sense-plan-act control loop is running fairly quickly with respect to the physical wheel movements. Control then returns to rotate epsilon operation 1102 and the process repeats for the next spoke mechanism at BDC. The virtual surface is essentially preferably a straight line over the discontinuity tangent to the outer edge 101 of the wheel 100. Correspondingly, the center of the wheel 100 traverses along a path parallel to the virtual surface 720 shown in FIGS. 7-9.

It will be clear that the present invention is well adapted to attain the ends and advantages mentioned as well as those inherent therein. While a presently preferred embodiment has been described for purposes of this disclosure, numerous changes may be made which will readily suggest themselves to those skilled in the art and which are encompassed in the spirit of the invention as set forth in the following claims.

What is claimed is:

1. A method for controlling movement of an intelligent wheel over a discontinuity in a travel surface, the method comprising:
   providing the wheel with a plurality of radially extensible spoke mechanisms fastened thereon, a plurality of sensors mounted on the wheel for sensing a travel surface, each sensor being associated with one of the plurality of spoke mechanisms, and a control system operable to receive signals from the sensors and transmit control signals to each of the sensor's associated spoke mechanism;
   sensing a position of the discontinuity with one or more of the sensors;
   calculating a virtual surface over the discontinuity; and
   extending a tip of one or more spokes of the spoke mechanisms beyond an outer circumference of the wheel to effectively increase a radius of the wheel so that, as one of the spoke mechanisms rotates to a bottom dead center (BDC) position of the wheel, the outer circumference of the wheel substantially follows the calculated virtual surface over the discontinuity.

2. The method according to claim 1 wherein the calculating operation comprises:
   scanning sensors at a BDC−1 position;
   determining whether the travel surface is flat;
   when the travel surface is flat, retracting the spoke of the spoke mechanism at a position BDC+1.

3. The method according to claim 1 wherein the calculating operation comprises:
   scanning sensors at a BDC−1 position, a BDC+1 position, and a BDC−2 position;
   determining whether the travel surface is flat;
   when the travel surface is not flat, determining a slope direction;
   calculating the virtual surface; and
   calculating a leg length of a spoke at the BDC−1 position.

4. The method according to claim 3 wherein when the slope is flat, retracting the spoke at the BDC−1 position when the spoke is extended.

5. A method for climbing and descending steps using an intelligent wheel apparatus, the wheel apparatus having a hub and an outer circumference adapted to move over a travel surface, the method comprising:
   detecting a vertical discontinuity in the travel surface using one or more obstacle sensors, each of the one or more obstacle sensors being associated with one or more spoke mechanisms capable of moving a spoke between a retracted position and an extended position, wherein a tip of a spoke extends beyond the outer circumference of the wheel when the spoke is moved to the extended position;
   calculating a virtual surface over the vertical discontinuity in the travel surface indicative of a step; and extending the spokes of the one or more spoke mechanisms to engage the step so that the outer circumference of the wheel substantially follows the calculated virtual surface as the intelligent wheel apparatus moves over the step.

6. The method of claim 5, wherein the virtual surface is substantially flat.

7. The method of claim 5, further comprising receiving force feedback from a force sensor associated with each spoke mechanism, wherein the force feedback indicates at least one of a lateral force and a lifting force applied to each spoke.

8. The method of claim 5, further comprising determining an orientation for each of the plurality of spoke mechanisms.

9. A method for controlling movement of an intelligent wheel over a travel surface, the wheel defining an outer circumference and including a hub adapted for rotation about an axis in a first direction to move the outer circumference of the wheel over the travel surface, the method comprising:

providing the wheel with a plurality of radially extensible spoke mechanisms spaced around the hub and fastened to the wheel, wherein a spoke in each extensible spoke mechanism moves between an extended position and a retracted position in response to commands from a controller, and wherein a tip of the spoke extends beyond the outer circumference of the wheel when the spoke is moved to the extended position;

sensing, using an obstacle sensor associated with each spoke mechanism, a discontinuity in the travel surface within a predetermined field of view;

calculating a virtual surface over a detected discontinuity within the travel surface; and extending the spokes of one or more spoke mechanisms so that the outer circumference of the wheel substantially follows the calculated virtual surface as the wheel moves in the first direction.

10. The method of claim 9, wherein the virtual surface is substantially flat.

11. The method of claim 9, wherein calculating a virtual surface comprises calculating the virtual surface from at least one sensor signal associated with a spoke mechanism forward of a bottom dead center (BDC) position of the wheel and a sensor signal associated with a spoke mechanism at a position after the BDC position.

12. The method of claim 11, wherein the spoke mechanism forward of the BDC position is at a position BDC−1, the method further comprising calculating a distance from the tip of the spoke in the spoke mechanism at the position BDC−1 to the travel surface to determine an extension amount.

13. The method of claim 12, further comprising repeatedly calculating the extension amount for the spoke mechanism at the position BDC−1 until the spoke mechanism reaches the BDC position.

14. The method of claim 12, wherein the spoke mechanism at the position after the BDC position is at a position BDC+1, and wherein a spoke mechanism forward of the position BDC−1 is at a position BDC−2, the method further comprising:

activating the obstacle sensors associated with the spoke mechanisms at positions BDC−2, BDC−1, BDC and BDC+1 to scan for discontinuities within the travel surface; and deactivating the obstacle sensors associated with a remaining plurality of spoke mechanisms that fall outside of the positions BDC−2, BDC−1, BDC and BDC+1.

15. The method of claim 14, further comprising moving the spokes for each of the remaining plurality of spoke mechanisms that fall outside of the positions BDC−2, BDC−1, BDC and BDC+1 to a refracted position.

16. The method of claim 14, further comprising determining, using an angular orientation sensor, which of the plurality of spoke mechanisms are located at the positions BDC−2, BDC−1, BDC and BDC+1.

17. The method of claim 9 further comprising receiving feedback from a force sensor associated with each spoke mechanism, wherein the feedback provides information regarding at least one of a lateral force and a lifting force applied to each spoke.

18. The method of claim 9, wherein the detected discontinuity within the travel surface comprises one of a positive or negative vertical discontinuity.

19. The method of claim 18, wherein the detected discontinuity within the travel surface further comprises a step.

* * * * *

UNITED STATES PATENT AND TRADEMARK OFFICE
CERTIFICATE OF CORRECTION

| | | |
|---|---|---|
| PATENT NO. | : 7,806,208 B2 | Page 1 of 1 |
| APPLICATION NO. | : 12/130753 | |
| DATED | : October 5, 2010 | |
| INVENTOR(S) | : Gunderson et al. | |

It is certified that error appears in the above-identified patent and that said Letters Patent is hereby corrected as shown below:

Title page, (57) Abstract, line 3: "and support disc portion that carries" should read --and support portion that carries--

Col. 5, line 36: "the portion 102 via a pair" should read --the support portion 102 via a pair--

Signed and Sealed this
Seventh Day of June, 2011

David J. Kappos
*Director of the United States Patent and Trademark Office*